US008170290B2

(12) United States Patent
Rauh et al.

(10) Patent No.: US 8,170,290 B2
(45) Date of Patent: May 1, 2012

(54) METHOD FOR CHECKING AN IMPRINT AND IMPRINT CHECKING DEVICE

(75) Inventors: Ingolf Rauh, Reichenau (DE); Udo Miletzki, Constance (DE)

(73) Assignee: Siemens Akteingesellschaft, Munich (DE)

( * ) Notice: Subject to any disclaimer, the term of this patent is extended or adjusted under 35 U.S.C. 154(b) by 1223 days.

(21) Appl. No.: 11/977,688

(22) Filed: Oct. 25, 2007

(65) Prior Publication Data

US 2008/0101679 A1 May 1, 2008

(30) Foreign Application Priority Data

Oct. 25, 2006 (DE) ......................... 10 2006 050 347

(51) Int. Cl.
*G06K 9/00* (2006.01)

(52) U.S. Cl. ....................................... 382/112; 382/231

(58) Field of Classification Search ........................ None
See application file for complete search history.

(56) References Cited

U.S. PATENT DOCUMENTS

| | | | | |
|---|---|---|---|---|
| 6,023,536 | A * | 2/2000 | Visser | 382/310 |
| 6,272,245 | B1 * | 8/2001 | Lin | 382/195 |
| 6,310,971 | B1 | 10/2001 | Shiiyama | |
| 6,373,982 | B1 * | 4/2002 | Maier et al. | 382/311 |
| 6,606,396 | B1 * | 8/2003 | Ishibashi et al. | 382/112 |
| 6,778,684 | B1 * | 8/2004 | Bollman | 382/112 |
| 7,003,162 | B2 | 2/2006 | Ohashi | |
| 7,920,714 | B2 * | 4/2011 | O'Neil | 382/100 |
| 2002/0097908 | A1 | 7/2002 | Ohashi | |
| 2004/0247169 | A1 * | 12/2004 | Ross et al. | 382/137 |

FOREIGN PATENT DOCUMENTS

| | | | |
|---|---|---|---|
| DE | 10157959 | A1 | 10/2002 |
| DE | 103 61 543 | A1 | 4/2005 |
| DE | 10 2006 012 513 | A1 | 9/2007 |
| EP | 0981114 | A1 | 2/2000 |
| EP | 0752673 | B1 | 4/2007 |
| WO | 2005025872 | A1 | 3/2005 |
| WO | 2007107234 | A1 | 9/2007 |

OTHER PUBLICATIONS

Derwent Abstract—DE 103 61 543 A1; Apr. 14, 2005; EyeC GmbH, D-20095 Hamburg, Germany.

Derwent Abstract—DE 10 2006 012 513 A1; Sep. 20, 2007; Man Roland Druckmaschinen AG, D-63075 Offenbach, Germany.

* cited by examiner

*Primary Examiner* — Stephen Koziol
*Assistant Examiner* — Barry Drennan
(74) *Attorney, Agent, or Firm* — Laurence A. Greenberg; Werner H. Stemer; Ralph E. Locher

(57) ABSTRACT

A method for checking an imprint reads an imprint, forms a data code from the imprint, and compares the data code with a predetermined number of check data codes of a stored data set. During a search for the data code in the data set, the method decides whether the data code is to be classified as acceptable or unacceptably faulty.

10 Claims, 4 Drawing Sheets

METHOD FOR CHECKING AN IMPRINT AND IMPRINT CHECKING DEVICE

CROSS-REFERENCE TO RELATED APPLICATIONS

This patent application claims the priority of German patent application no. 10 2006 050 347.3, filed Oct. 25, 2006, the entire contents of which is hereby incorporated herein by reference.

BACKGROUND OF THE INVENTION

The invention relates to a method for checking an imprint, by which an imprint is read and from it a data code formed, and the data code is compared with a number of check data codes in a stored data set. Apart from this, the invention relates to an imprint checking device with a reader for scanning an imprint, a memory with at least one stored data set with a number of check data codes and a computational unit for the purpose of forming a data code from the imprint and for comparing the data code with at least one check data code.

In the pharmaceutical field, but also in other production areas, there is frequently a requirement for precise quality control of imprints, for example on labels which are affixed to medicines. As an example, it is essential in the clinical studies environment that certain fields on the label, such as the patient number or lot number, can be read in full, character for character, absolutely unambiguously and correctly, that is they can be read with no deviation from the original. Other label fields, for which it is possible to deduce a character from the context, are not subject to any such high quality requirement. Hence, a field containing the imprint “Store out of reach of children” is still unambiguously comprehensible in spite of the missing cross stroke on the third “e” which turns the “e” into a “c”. To protect the consumer the EU has issued a guideline, especially for the pharmaceutical industry, which defines the concept of content-based comprehensibility, and requires a proof of this comprehensibility in the quality control of label imprints.

The known method of satisfying this requirement is to check samples of the labels manually for the correctness of their contents. To do so, an operative reads the labels and attempts to find faults. As this activity is very tiring, faults are frequently overlooked. Apart from that, this approach only permits checking of a small fraction of all the labels.

Ways are also known for carrying out checks on label imprints, documents, imprints on objects and suchlike by machine and automatically. Such a check can be based on a pixel-wise comparison of the image between an original print master and the printed label. However, such methods are only reliable under some conditions, because they make no distinction between distortions which require rejection and tolerable ones. If a small limit is set for the tolerable pixel error, then too many errors will be output and a flood of usable labels will be rejected. If the pixel error limit is too large, then even small pixel errors can lead to incorrect letters, and hence to a corruption of the meaning. Thus, for example, a small pixel error can turn “Store out of reach of children” into the misunderstandable text “Score out of reach of children”, which cannot be tolerated. In the case of East Asian characters, such errors can have even more disastrous effects.

Ways are known in addition of checking imprints by means of OCR (Optical Character Recognition) methods. Here, an imprint is read and characters from the imprint are encoded as a data code comprising letters and digits, for example in UNICODE. This makes it possible to compare the print master and imprint directly, character by character. However, even such a method is not capable of checking faults for their corruption of the meaning. Thus, the fault “Pleese store out of reach of children” is acceptable, whereas “Please score out of reach of children” is misleading.

SUMMARY OF THE INVENTION

The objective of the present invention is therefore to specify a method for checking an imprint, and an imprint checking device, with which a good checking performance can be achieved combined with a low number of rejected imprints.

Accordingly, a method for checking an imprint reads an imprint, forms a data code from the imprint, and compares the data code with a predetermined number of check data codes of a stored data set. During a search for the data code in the data set, the method decides whether the data code is to be classified as acceptable or unacceptably faulty. Imprints which are acceptably faulty can be further processed without being rejected, and any rejection can be restricted to faults which corrupt the meaning and unknown faults.

In doing this, the invention starts from the consideration that it is possible to carry out reliable content-based fault checking if known specific faults have already been classified as acceptable or unacceptable. These known faults can be written into the data set as individual check data codes, and the data code can be compared in terms of their content against these known check data codes. If agreement is found between a data code and one of the check data codes, it is then possible to decide, by reference to the fault thereby identified, whether the fault in the data code is acceptable or not. Any fault which is categorized as acceptable thus no longer needs to be rejected or presented to a decision maker, for example a checking operative. The rejection rate can by this means be kept low without impairing the checking performance, because only known acceptable faults will pass the checking system while unknown and known unacceptable faults will continue to be sorted out or rejected, as applicable.

An imprint can be any character-like data applied to an object, in particular a label, where the character-like data preferably include characters to be read by persons, in particular alphanumeric characters, that is letters and digits. The data code and check data code can be any machine-readable code which represents the character-like data. It is expedient if the data code covers a string of characters. It is expedient if the data format for the check data codes is that of the data code which is to be checked. The search for the data code in the data set can be effected by making a character string comparison in the data set to find a check data code which is the same as the data code or is similar to it to a prescribed extent.

In an advantageous embodiment, the data set has a list of acceptable check data codes and a list of unacceptably faulty ones, whereby the decision will be made dependent on which of the lists the data code is found in. In this way, it is possible to make a simple and rapid decision about the acceptance of a data code. The list of acceptable check data codes can include a template code or an intended data code which represents the print master.

Another advantageous embodiment provides that, in searching for the data code in the data set, a prescribed deviation of the data code from a check data code in the data set is permissible. It is then possible, for example in accordance with known methods for comparing strings, e.g. according to Levenshtein, to determine quantitatively any deviation of the data code from the nearest check data code, e.g. as a Levenshtein distance, and if this is below a prescribed lower limit to assign the data code to the check data code. If a variant of a character string in the imprint is in this way found within the list of acceptable check data codes, with a very high reliability according to the deviation algorithm used, then the imprint is deemed to be acceptable. In this way it is possible to further decrease the rate of tolerable faults. The deviation can be the distance between data codes.

It is also advantageous if the data set contains a list with at least one check data code which contains a dummy, that is a character which permits any arbitrary character. If any possible character whatever in the position of the dummy would lead to rejection or to acceptance of the data code, then it is possible in this way to keep the corresponding list short, and any comparison operation rapid.

It is further proposed that the permitted deviation is made dependent on whether the check data code is classified as acceptable or unacceptably faulty. A distinction can be made between important and unimportant data, or between data which is easily comprehensible and that where the meaning is easily corrupted, and the distance adapted appropriately. Thus it is possible, for example, for some variations on a text item which is important and easy to misunderstand to be acceptable, but that further deviations from these variations must be rejected as unacceptable in spite of a strong similarity with the acceptable variations. In this case, the deviation can be set very small, so that there is a low risk of a data code being incorrectly assigned as a sensitive acceptable check data code.

The production of the data set before the first checks on imprints of the same type would call for much imagination and effort, to produce all the possible acceptable and unacceptable check data codes. The data set can be simply and comprehensively created if a data code is output for checking by a decision-maker if no matching check data code is found in the data set. Thus, for example, checks can start on a label type with the data set containing no check data codes, or only the intended data code corresponding exactly to the print master. As soon as a first imprint with a deviation is detected this will be output to the decision-maker, for example a person, in visual form, e.g. on a screen. The decision-maker will decide whether the data which the data set represents, e.g. a character string, is comprehensible in the way meant by the print master, and will classify the data code accordingly. It is of advantage if the decision from the decision-maker is recorded in the data set. The classified data code can then be stored away appropriately as a check data code, e.g. in one of the two lists. In this way it is possible to maintain the data set, so that the output of unknown data codes to the decision-maker becomes steadily more rare. It is expedient if the decision-maker is a person, but here it is also possible to conceive of a computational unit which checks the meaning of the imprint in accordance with prescribed semantic algorithms.

The error rate in the checking of imprints can be further reduced if the imprint is subdivided into data which is tolerant or intolerant in respect of variations, and the data code is handled differently depending on whether it belongs to the tolerant or the intolerant data. The data category to which a character string belongs can be determined from its position within the imprint, without the need to read the character string character by character for this purpose. It is possible in this way, for example, to permit greater deviations for fault-tolerant data than for important or easily misunderstood data.

It is advantageous if a data code which has been assigned to the intolerant data must agree completely with an intended data code for it to be classified as acceptable. The intended data code will preferably correspond to the print master. Items of data which allow absolutely no deviation, such as a patient number or shelf-life data, can be checked very critically, without small faults in the remaining imprint leading to a large number of rejects. To this end it is advantageous, in the case of a data code which has been assigned to the tolerant data, to permit deviations from an intended data code in order to classify the data code as accepted.

The objective for the imprint checking device is achieved by an imprint checking device of the type mentioned in the introduction, for which the computational unit is set up in accordance with the invention so that when a data code is sought in the data set it decides whether the data code is classified as acceptable or unacceptably faulty. The rejection rate can be kept low, and unacceptable faults can be recognized with high reliability.

BRIEF DESCRIPTION OF THE SEVERAL VIEWS OF THE DRAWINGS

The invention will be explained in more detail by reference to exemplary embodiments, which are shown in the drawings, in which.

DETAILED DESCRIPTION OF THE INVENTION

Figure 1:
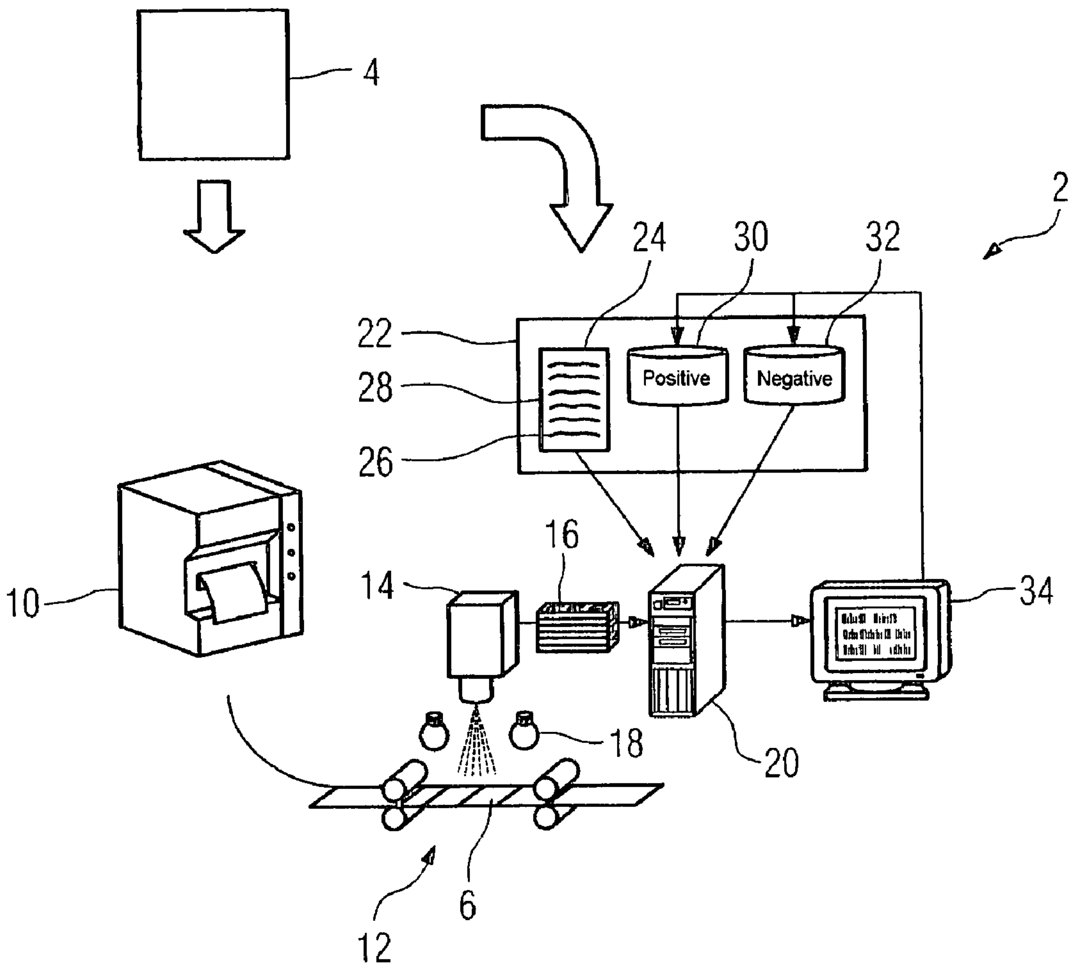
FIG. 1 shows an imprint checking device with a data store which has a positive and a negative list.
Figure 2:
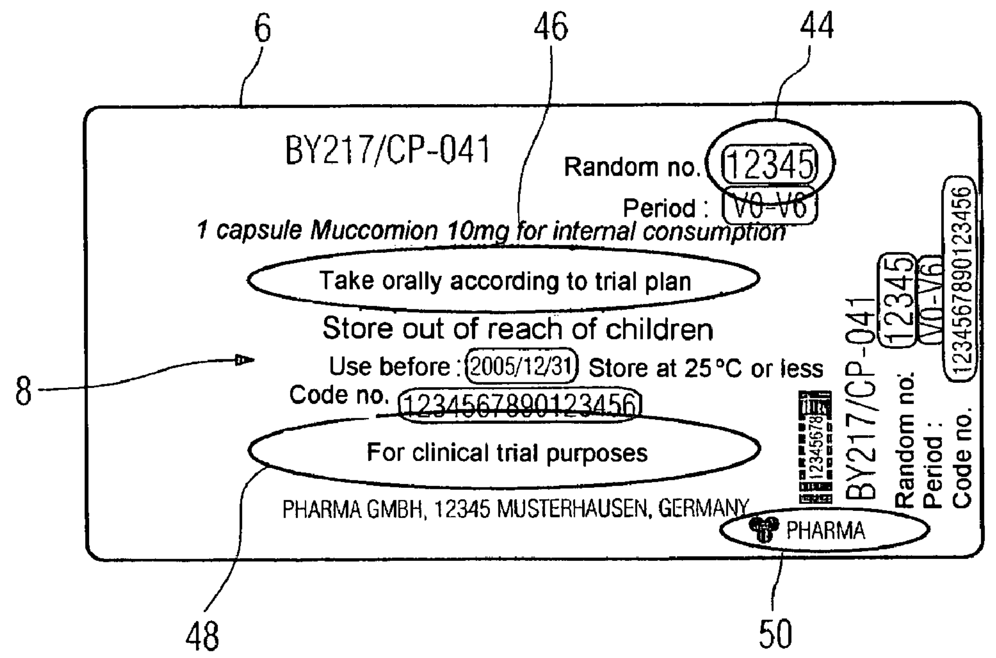
FIG. 2 shows a fault-free imprint on a label.

FIG. 1 shows in schematic form, beside an imprint checking device 2, a drafting system 4 for labels, for example for a label 6 such as that shown in FIG. 2. With the help of the drafting system 4, an imprint 8 is drafted and written into a specification file in appropriately encoded form. The specification file is communicated to a printer 10, which prints out the label 6.

For the quality check which is to be carried out after this, the label 6 is fed to the imprint checking device 2, which moves the label 6 using a transport device 12 into the recording area of a reader 14. This makes an image 16 of the imprint 8 on the label 6, which is adequately lit by a lighting device 18, and this image is communicated to a computational unit 20. The computational unit 20 has access to a data store 22 in which the drafting system 4 has stored a print master 24, with a number of intended data codes 26, in the form of a specification file 28. In addition, the data memory 22 includes two lists 30, 32 with check data codes, to which the computational unit 20 also has access. An output unit 34, in the form of a screen, is used for outputting to a human checker parts of the imprint 8 which are represented by data codes 38, 40 (FIG. 3).

The imprint 8 on the label 6, shown in FIG. 2, has a number of character strings which—together with the positions of the character strings—are stored in the specification file 28, in each case as a intended data code 26. Here, a character string consists of a whole line, one or more words or a number on the imprint 8. Each of the intended data codes 26 represents at the same time a check data code 44, 46, 48, 50, of which only four check data codes 44, 46, 48, 50 are marked as such in FIG. 2 for reasons of clarity. The check data code 48, for example, consists of data which represent the character string “For clinical trial purposes”. The imprint 8 is subdivided into tolerant, averagely tolerant and intolerant data, so that each of the intended data codes 26 belongs to one of these data sets.

This subdivision is also contained in the specification file 28. The check data code 48 is, for example, assigned as averagely tolerant data.

Figure 3:
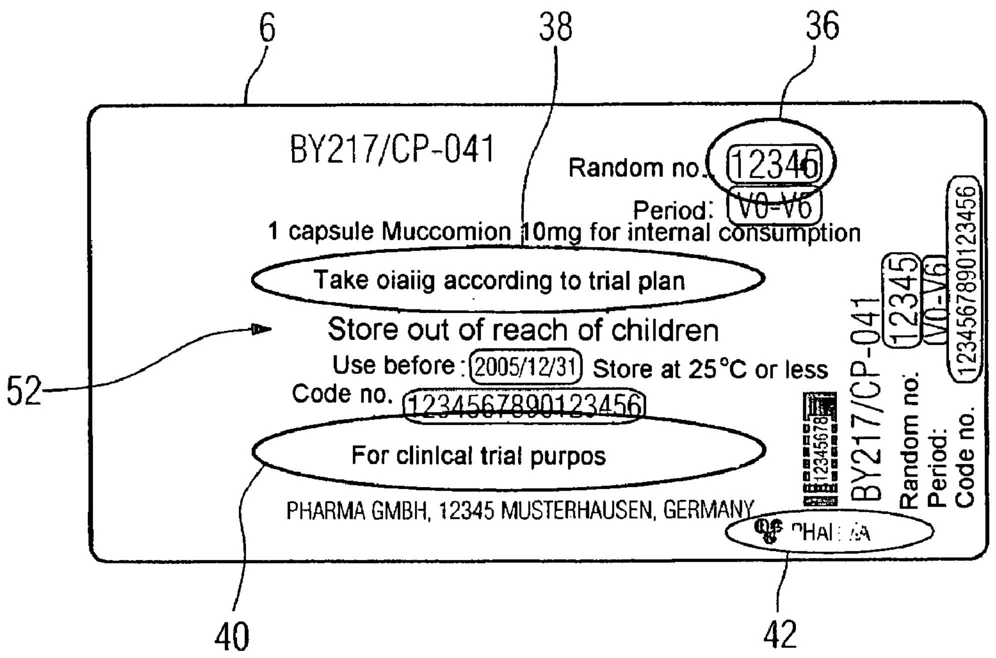
FIG. 3 shows a label to be checked for faults.

FIG. 3 shows an imprint 52 which has smaller and greater imperfections. The imprint 52 is read by the reader 14, and from its image 16 the computational unit 20 retrieves numerous data codes 36-42, of which only four are marked, again for reasons of clarity. The computational unit 20 then compares each data code 36-42 with the corresponding check data code 44-50. This will now be clarified by reference to the data code 40.

Figure 4:
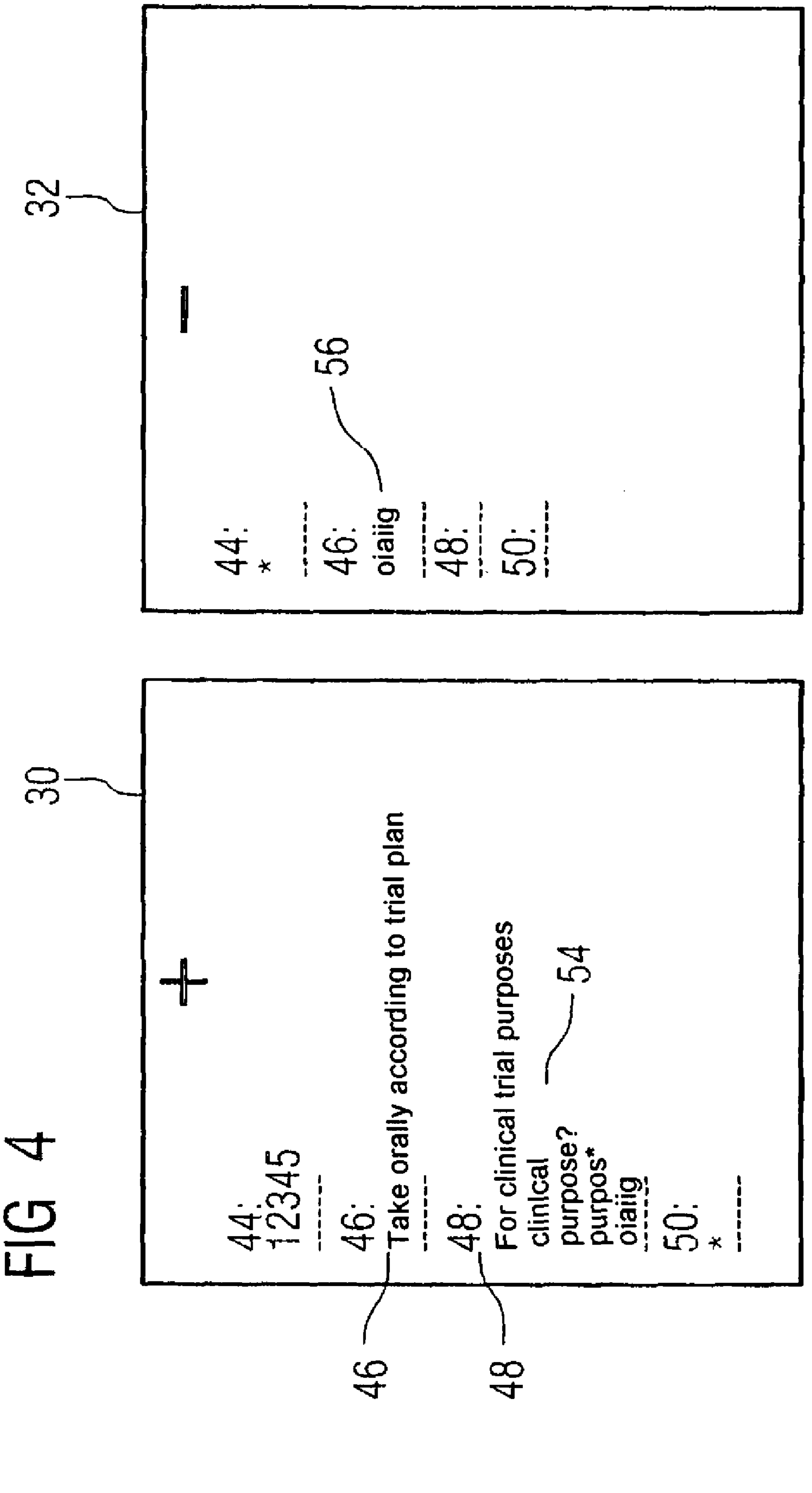
FIG. 4 shows the positive and the negative lists with check data codes.

The computational unit 20 includes an OCR component which reads the text from the image 16 of the imprint 52 character by character, and from the character string thus read forms the data code 40. The character string reads "For clinlcal trial purpos??", where the second word has been incorrectly deciphered due to a small ink spot, and where although it has been possible to detect the last two characters of the last word they could not be deciphered. This data code 40 is compared with the check data code 48, for example word by word. First, the word "clinlcal" is not the same as the word "clin ical" in the check data code 48. The computational unit 20 now checks whether the character string "clinlcal" appears in one of the lists 30, 32 as a variation of the character string "clinical". This is initially not the case. The computational unit 20 therefore outputs on the output unit 34 either the entire text corresponding to the data code 40 or merely "clinlcal". The checking operative now decides into which of the lists 30, 32 a new check data code should be inserted, as a variation of the check data code 48 "For clinical trial purposes", with the word "clinlcal". Because the correct word "clinical" can immediately be deduced from its context in the sentence, a new check data code 54 is inserted into the positive list 30, as shown schematically in FIG. 4. This list 30 now contains, apart from the entry for the correct string "clinical", the additional entry "clinlcal", or in each case the entire sentence.

The computational unit 20 proceeds in the same way with the word "purpos..", which the decision-maker also classifies as recognizable and thus acceptable. As he considers the last two letters to be non-essential, he enters the word "purpose?" with a dummy for one character, and "purpos*" with a dummy for an indefinite number of characters into the list 30.

Now if, at a later time, a label 6 is checked which has a similarly faulty imprint, in that the word "clinlcal" or "purposea" or something similar appears, then the computational unit 20 will find, for example, the check data code 54 which indicates that "clinlcal" is acceptable, and will classify the correspondingly faulty data code as accep table.

In turn, the computational unit 20 proceeds in a corresponding way with the data code 38, where the decision maker considers the character string which the OCR unit has deciphered as "Take oiaiig according to trial plan" to be incomprehensible and inserts the word "oiaiig"—or the entire incomprehensible sentence—into the negative list 32. From then on, the corresponding new check data code 56 can be found by the computational unit 20 and assigned to the data code 38, which is thereby classified as unacceptably faulty. This fault alone is a reason why the label 6 will be rejected.

The check data code 44 is categorized in the specification file 28 as intolerant data, and therefore permits no faults. However, the corresponding item of data on the imprint 52 has been read as "12346", and the data code 36 has been correspondingly generated. Only "12345" is noted in the positive list 30, whereas it is noted in the negative list that any other character string is unacceptable. Hence again, this fault in the imprint 52 is by itself a reason why the label 6 will be rejected as unacceptable.

In the example shown in FIG. 3 it is also impossible to decipher the text "PHARMA" in the data set 42, because it is incompletely printed. However, the check data code 50 is identified as tolerant data, and it is noted in list 30 that any characters are acceptable. For this reason the data set 42 is classified as acceptable.

Depending on their subdivision into tolerant, averagely tolerant and intolerant data in the specification file 28, the data items on the imprint 52 will also be handled differently in respect of the character recognition. In the case of intolerant data, to which the check data code 44 belongs, a character must be deciphered with a very high probability for it to be considered as deciphered. Here therefore, demanding requirements are imposed on the printing. In the cases respectively of averagely tolerant or intolerant data, an average or even lower probability is sufficient for the deciphering, so that here the requirements to be met by the printing are lower or low respectively. Apart from this, the probability is dependent on whether the deciphered data code 36-42 is acceptable or not. For example, if a deciphered data code 40, 42 is classified as acceptable it is possible to check whether the decipherment probability lies above a prescribed value, which is higher than for an unacceptable data code 36, 38. If it is not, the data code 40, 42 can be rejected nevertheless.

Figure 5:
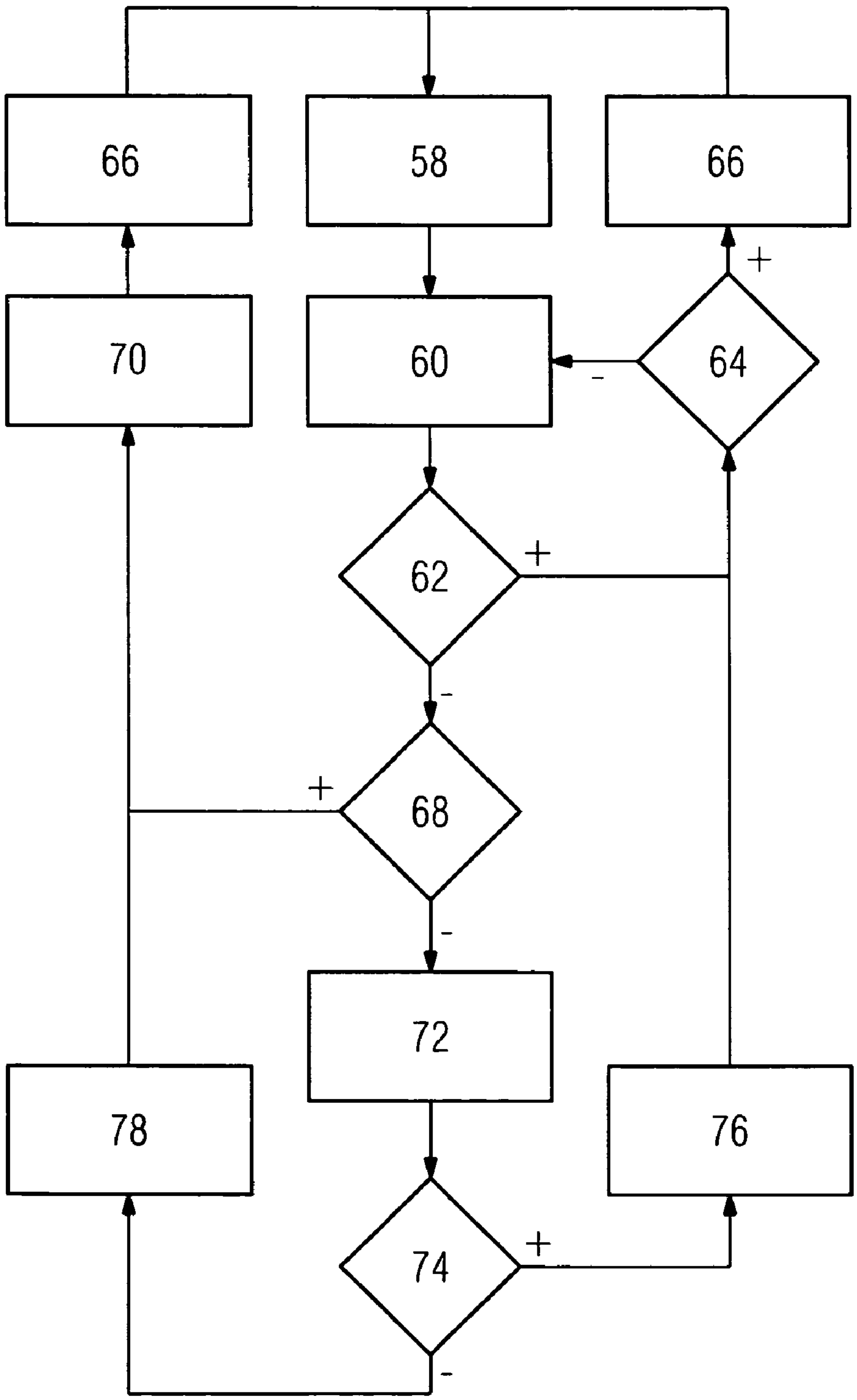
FIG. 5 shows a flow diagram of a method for checking an imprint.

A flow diagram for a method for checking the imprint 52 is shown in FIG. 5. First, the imprint 52 is read 58 by the reader, is deciphered as a character string, and from this a data code 36-42 is formed. The data codes 36-42 are then compared 60 with the lists 30, 32 on the basis of the prescribed positions in the specification file 28. The positive list 30 is searched first. If this check 62 is successful, that is the data code 42 is in the positive list 30, then the data code 42 is classified as acceptable. A check 64 is then made as to whether all the data codes 36-42 for the imprint 52 have been checked. If not, the next data code 36-42 is compared 60. It is, of course, also possible that an imprint includes only one single data code, so that the check 64 is inapplicable. When all the data codes have 36-42 have been checked, then the next label, document, form or suchlike is transported 66 to the reader 14 and read 58.

If it is determined in the course of the checking 62 that the data code 36-40 cannot be found in the positive list 30, a check is then made 68 on whether it can be found in the negative list 32. If so, then the label 6 is picked out 70 for replacement, and the next label is transported 66 to the reader 14 and is read 58. If the check 68 also gives a negative result, that is if the data code 38, 40 is in neither of the lists 30, 32, then it is output 72 to the decision-maker. He decides 74 whether the data code 38, 40 is classified as acceptable or unacceptable. If the data code 40 is acceptable, then it is written 76 into the positive list 30, and the check 64 is then made on whether all the data codes 36-42 have been checked. If the data code 38 is unacceptable, then it is written 78 into the negative list 32, and the label 6 is picked out 70.

The invention claimed is:

1. A method for checking an imprint with a computer configured to perform the steps of:

reading an imprint;

forming a data code from the imprint, said data code representing character-like data;

performing a content-based fault checking by comparing the data code with a predetermined number of check data codes of a stored data set, with known faults being written in said data set as said check data codes; and during a search for the data code in the data set, deciding whether the data code is to be classified as acceptable or unacceptably faulty based on said search; and determining whether to reject said imprint based on said decision.

2. The method of claim 1, wherein the data set includes a list of acceptable check data codes and a list of unacceptably faulty ones, and wherein a decision is made depending on in which of the lists the data code is found.

3. The method of claim 1, wherein in searching for the data code in the data set, a prescribed deviation of the data code from a check data code in the data set is permissible.

4. The method of claim 3, wherein the permitted deviation is dependent on whether the check data code is classified as acceptable or unacceptably faulty.

5. The method of claim 1, further comprising outputting the data code for checking by a decision-maker if no matching check data code is found in the data set.

6. The method of claim 5, further comprising recording a decision by the decision-maker in the data set.

7. The method of claim 1, further comprising subdividing the imprint into data which is tolerant in respect of variations and data which is intolerant, and processing the data code differently depending on whether it belongs to the tolerant or intolerant data.

8. The method of claim 7, wherein, in order to be classified as acceptable, a data code which has been assigned to the intolerant data must agree completely with an intended data code.

9. The method of claim 7, wherein in case of a data code assigned to the tolerant data, deviations are permitted from the intended data code in classifying the data code as accepted.

10. An imprint checking device, comprising:

a reader configured to scan an imprint;

a data store with at least one stored data set comprising a number of check data codes, with known faults being written in said data set as said check data codes; and a computational unit configured to form a data code from the imprint, said data code representing character-like data, and to compare the data code with at least one check data code, wherein the computational unit is further configured to decide, during a search for the data code in the data set, whether the data code is classified as acceptable or unacceptably faulty based on said search; and determining whether to reject said imprint based on said decision.

* * * * *